(12) United States Patent
Johnson et al.

(10) Patent No.: US 8,248,267 B2
(45) Date of Patent: Aug. 21, 2012

(54) SYSTEMS AND METHODS FOR IMPROVING RECEPTION OF DATA IN WIRELESS COMMUNICATION ENVIRONMENTS

(75) Inventors: Matthew Johnson, Spokane, WA (US); Mark Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 739 days.

(21) Appl. No.: 12/362,013

(22) Filed: Jan. 29, 2009

(65) Prior Publication Data

US 2010/0188254 A1 Jul. 29, 2010

(51) Int. Cl.
G08B 23/00 (2006.01)
G08C 15/06 (2006.01)

(52) U.S. Cl. .................. 340/870.02; 370/328; 370/332; 370/337; 370/329; 370/341; 370/431; 370/437; 709/224; 702/62; 455/418; 455/419; 455/423; 455/424; 455/425; 455/450; 455/451; 455/452.1; 455/452.2; 455/501

(58) Field of Classification Search ................... None
See application file for complete search history.

(56) References Cited

U.S. PATENT DOCUMENTS

| | | | | | |
|---|---|---|---|---|---|
| 5,907,491 | A | * | 5/1999 | Canada et al. ................. | 700/108 |
| 6,078,251 | A | * | 6/2000 | Landt et al. ................. | 340/10.41 |
| 6,349,094 | B1 | * | 2/2002 | Vastano et al. ................ | 370/328 |
| 7,142,123 | B1 | * | 11/2006 | Kates ............................ | 340/602 |
| 2001/0046225 | A1 | * | 11/2001 | Schwaller et al. ............ | 370/343 |
| 2002/0186749 | A1 | * | 12/2002 | Jones ............................. | 375/132 |
| 2005/0053047 | A1 | * | 3/2005 | Osterloh et al. .............. | 370/344 |
| 2005/0270173 | A1 | * | 12/2005 | Boaz ........................ | 340/870.02 |
| 2006/0205358 | A1 | * | 9/2006 | Itoh et al. ........................ | 455/69 |
| 2007/0073866 | A1 | * | 3/2007 | Rudran et al. ................ | 709/224 |
| 2007/0229256 | A1 | * | 10/2007 | Seal et al. ..................... | 340/551 |
| 2008/0095075 | A1 | * | 4/2008 | Monier ........................ | 370/257 |
| 2009/0016293 | A1 | * | 1/2009 | Kang et al. .................... | 370/329 |
| 2010/0164719 | A1 | * | 7/2010 | George et al. ................. | 340/541 |

* cited by examiner

*Primary Examiner* — Rexford Barnie
*Assistant Examiner* — Justen Fauth
(74) *Attorney, Agent, or Firm* — Dority & Manning, P.A.

(57) ABSTRACT

Generally described, the disclosed subject matter is directed to improving the reception of data in wireless communication environments. In accordance with one embodiment, a method is provided for improving the reception of meter data in an AMR system. In particular, the method includes obtaining a sample of data indicative of channel quality for each transmission channel in the operational frequency band of the endpoint device. Then, the data is analyzed and a determination is made as to whether the reception of data by the collection system can be improved. If the reception of data by the collection system can be improved, a command is generated for reprogramming the endpoint device. In one embodiment, the command includes channel reprogramming data for reprogramming the endpoint device.

16 Claims, 8 Drawing Sheets

SYSTEMS AND METHODS FOR IMPROVING RECEPTION OF DATA IN WIRELESS COMMUNICATION ENVIRONMENTS

BACKGROUND

Historically the meter readings of the consumption of utility resources such as water, gas, or electricity has been accomplished manually by human meter readers at the customers' premises. The relatively recent advances in this area include collection of data by telephone lines, radio transmission, walk-by, or drive-by reading systems using radio communications between the meters and the meter reading devices. Although some of these methods require close physical proximity to the meters, they have become more desirable than the manual reading and recording of the consumption levels. Over the last few years, there has been a concerted effort to automate meter reading by installing fixed networks that allow data to flow from the meter to a host computer system without human intervention. These systems are referred to in the art as Automated Meter Reading (AMR) systems.

An AMR system consists of three basic components: an Encoder-Receiver-Transmitter (ERT); a Data Collection Unit (DCU); and an AMR computing system. The ERT is a meter interface device attached to the meter, which either periodically transmits utility consumption data ("bubble-up" ERTs), or receives a "wake up" polling signal or a request for their meter information from the DCU (e.g., a fixed transceiver unit, a transceiver mounted in a passing vehicle, a handheld unit, etc.) The ERT, either periodically or in response to a wake-up signal, broadcasts the meter number, the meter reading, and other information to the DCU. The DCU collects the information from the ERTs for subsequent retransmission to the AMR computing system. The AMR computing system receives the newly collected meter readings and updates the appropriate accounts of the billing system.

The ERTs typically communicate with the DCU via wireless spread-spectrum modulation protocols, such as direct-sequence spread-spectrum (DSSS) and frequency-hopping spread-spectrum (FHSS). DSSS combines a data signal at the ERT with a higher data-rate bit sequence, sometimes called a "chipping code" or "processing gain." A high processing gain increases the signal's resistance to interference. FHSS, on the other hand, operates by taking the data signal and modulating it with a carrier signal that hops from frequency to frequency as a function of time over a wide band of frequencies. With FHSS, the carrier frequency changes periodically, and therefore, potentially reduces interference since an interfering signal from a narrowband system will only affect the spread-spectrum signal if both are transmitting at the same frequency and at the same time.

However, in the FHSS systems described above, interference from various sources, such as geographical obstructions, unlicensed radios, portable phones, and the like, decrease the probability that transmissions will be received.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the disclosed subject matter is directed to improving the reception of data in a wireless communication environment, such as an AMR environment. The environment includes an endpoint device having a plurality of transmission channels within an operational frequency band, a collection system, and a host computing system. In accordance with one embodiment, a method is provided for improving the reception of data transmitted from the endpoint device. In accordance with this embodiment, the method includes obtaining a sample of data indicative of channel quality for each transmission channel in the operational frequency band of the endpoint device. Then, the data is analyzed and a determination is made as to whether the reception of data by the collection system can be improved. If the reception of data by the collection system can be improved, a command is generated for reprogramming the endpoint device. In one embodiment, the command includes channel reprogramming data for reprogramming the endpoint device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following description first provides a general description of a meter reading system in which the disclosed subject matter may be implemented. Then, exemplary routines that provide improved data reception are described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Although not required, several aspects of the present disclosure are described in the general context of computer-executable instructions, such as routines executed by a general-purpose computer (e.g., a server computer, wireless device, or personal/laptop computer). Those skilled in the relevant art will appreciate that aspects of the present disclosure can be practiced with other communications, data processing, or computer system configurations, including Internet appliances, hand-held devices (including personal digital assistants (PDAs)), wearable computers, cellular or mobile phones, embedded computers (including those coupled to vehicles), programmable consumer electronics, set-top boxes, network PCs, mini-computers, mainframe computers, and the like.

Several aspects of the present disclosure can be embodied in a special purpose computer or data processor that is specifically programmed, configured, or constructed to perform one or more of the computer-executable instructions explained in detail herein. Several aspects of the present disclosure can also be practiced in distributed computing environments where tasks or modules are performed by remote processing devices, which may be linked through a communication network. In a distributed computing environment, program modules may be located in both local and remote memory storage devices.

Aspects of the present disclosure may be stored or distributed on computer-readable media. As used herein, the term "computer-readable media" includes volatile and non-volatile, removable and non-removable memory implemented in a method or technology capable of storing information, such as computer readable instructions, data structures, program modules, and other data. Examples of computer readable media include but are not limited to magnetically or optically readable computer disks, as microcode on semiconductor memory, nanotechnology memory, organic or optical memory, or other portable data storage media. Indeed, computer-implemented instructions, data structures, and other data under aspects of the present disclosure may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme).

Figure 1:
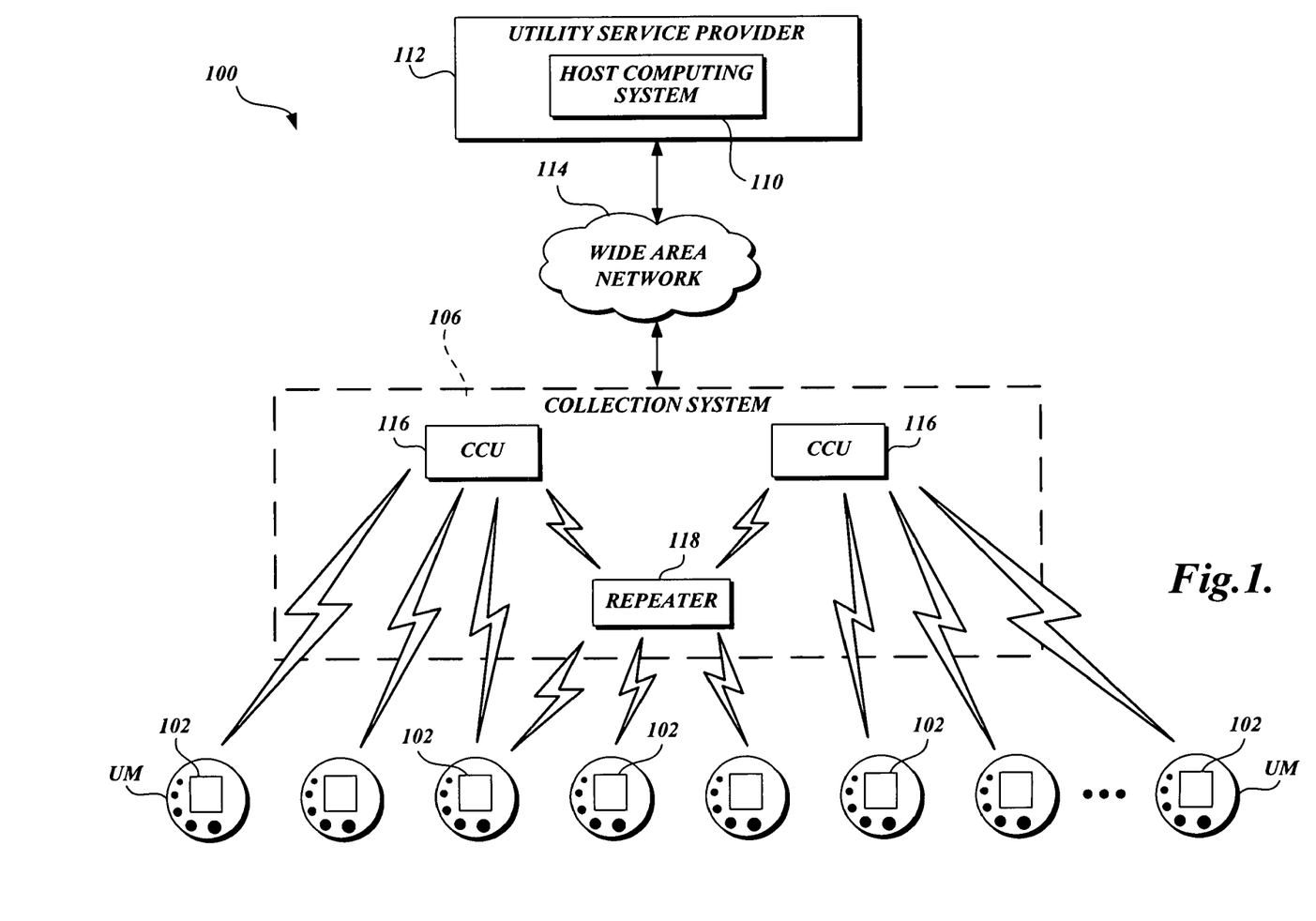
FIG. 1 is a block diagram depicting an illustrative meter reading system formed in accordance with an embodiment of the disclosed subject matter.

Referring now to FIG. 1, the following is intended to provide a general description of one embodiment of a communication system, such as a meter reading system 100, in which aspects of the present disclosure may be implemented. In one embodiment, the meter reading system 100 may be an automated meter reading (AMR) system that reads and monitors utility meters from a remote location, typically using a collection system comprised of fixed collection units, mobile collection units, handheld reader units, mesh/micro networks, etc.

Generally described, the meter reading system 100 depicted in FIG. 1 includes a plurality of endpoint devices 102, a collection system 106, and a host computing system 110. The endpoint devices 102 are associated with, for example, utility meters UM (e.g., gas meters, water meters, electric meters, etc.), for obtaining data, such as meter data (e.g., consumption data, tampering data, etc.) therefrom. The endpoint devices 102 in the meter reading system 100 may be a wired or wireless communications device capable of performing two way communications with the collection system 106 utilizing automated meter reading protocols. For example, the endpoint devices 102 are capable of receiving data (e.g., messages, commands, etc.) from the collection system 106 and transmitting meter data and/or other data to the collection system 106. Depending on the exact configuration and types of devices used, the endpoint devices 102 transmit meter and/or other data either periodically ("bubble-up"), in response to a wake-up signal, or in a combination/hybrid configuration. In each instance, the endpoint devices 102 are configured to exchange data with the collection system 106.

Still referring to FIG. 1, the collection system 106 of the meter reading system 100 collects meter data and other data from the plurality of endpoint devices 102, processes the data, and forwards the data to the host computing system 110 of a utility service provider 112. The collection system 106 may employ any number of automated meter reading protocols and devices to communicate with the endpoint devices 102. For example, in the embodiment shown, the collection system 106 may include a fixed network comprised of one or more Cell Control Units 116 ("CCU 116") that collect radio-based meter readings within a particular geographic area either directly from the endpoint devices 102, or indirectly via one or more optional repeaters 118. It will be appreciated that the collection system 106 may additionally or alternatively include mobile, handheld, and/or micro-network readers (not shown).

In the embodiment depicted in FIG. 1, the collection system 106 is configured to forward meter readings to the host computing system 110 of the utility service provider 112 over a wide area network 114, which may be implemented utilizing TCP/IP Protocols (e.g., Internet), GPRS or other cellular-based protocols, Ethernet, WiFi, Broadband Over Power Line, and combinations thereof, etc. In one aspect, the collection system 106 serves as the bridge for transmitting data between devices that utilize automated meter reading protocols (e.g., the endpoint devices 102) with computers (e.g., the host computing system 110) coupled to the wide area network 114. The host computing system 110 includes application logic for reading, processing, and managing the collection of meter data. As described in further detail below, the host computing system 110 is configured for analyzing a sample of collected data so as to determine which channels in the associated frequency band are best suited (e.g., having lower interference) for communications between a CCU 116 and each particular endpoint device 102.

The discussion provided above with reference to FIG. 1 is intended as a brief, general description of one meter reading system 100 capable of implementing various features of the present disclosure. While the description above is made with reference to particular devices linked together through different interfaces, those skilled in the art will appreciate that the claimed subject matter may be implemented in other contexts. In this regard, the claimed subject matter may be practiced using different types of devices and communication interfaces than those illustrated in FIG. 1.

Figure 2:
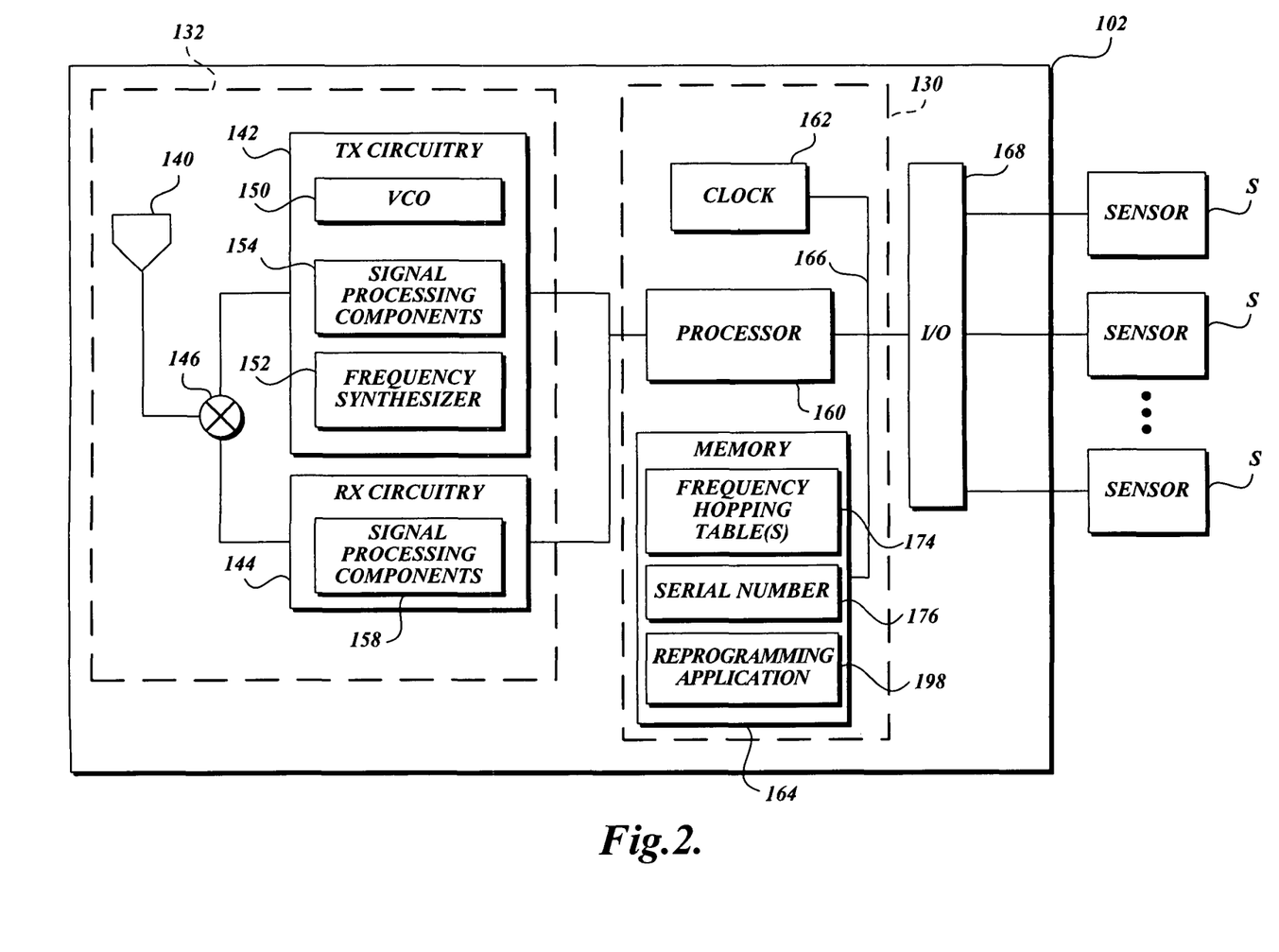
FIG. 2 is a block diagram depicting components of one example of an endpoint device formed in accordance with an embodiment of the disclosed subject matter.

Turning now to FIG. 2, there is shown one example architecture of an endpoint device 102 for use in the meter reading system 100. Each endpoint device 102 continuously gathers and stores meter data from the associated sensors of the utility meters. Upon request or periodically (e.g., every 30 seconds) the endpoint device 102 retrieves the stored data, formats and/or encodes the data according to one or more protocols, and transmits this data with other information via radio frequency (RF) communication links to the repeaters 118 and/or the CCUs 116. The endpoint devices 102 are also capable of receiving data from the repeaters 118, the CCUs 116, or other RF-based communications devices.

As will be described in more detail below, one embodiment of the endpoint device 102 transmits data over a preselected set of frequency channels in a predefined frequency band ("operational frequency band") using frequency hopping spread spectrum (FHSS) techniques. For example, in one embodiment, the endpoint device 102 may operate over a preselected set of 80 channels approximately 200 KHz in width. One example of such a frequency band is the 902-918 MHz portion of the ISM frequency band, although other portions of the ISM or other radio frequency bands may be used. The operational frequency band may be contiguous (e.g., 902-918 MHZ) or non-contiguous (e.g., 902-908 and 916-924 MHz). In this embodiment, the endpoint device 102 may frequency hop between channels in the entire operational frequency band or may frequency hop between a subset of channels (e.g., fifty (50) channels) in the operational frequency band.

For carrying out the functionality described above, each endpoint device 102 comprises a main computing device 130 communicatively coupled to a communications device 132. In the example depicted in FIG. 2, the communications device 132 is a radio-based transceiver, transmitter-receiver, or the like that may include a communications antenna 140, transmit (TX) circuitry 142 and receive (RX) circuitry 144, and an antenna multiplexer 146 that switches between the transmit (TX) circuitry 142 and the receive (RX) circuitry 144 depending on the mode of operation. The transmit (TX) circuitry 142 may include various components for transmitting FHSS signals, such as a voltage controlled oscillator (VCO) 150 and a frequency synthesizer 152 for tuning the VCO 150 to the proper channel and maintaining the channel under varying load conditions. As well know in the art, the transmit (TX) circuitry 142 may also include various signal processing components 154, such as power amplifiers, upconverters, filters, etc. Similarly, receive (RX) circuitry 144 may comprise, for example, one or more signal processing components 158, such as filters, low noise amplifiers (LNAs), downconverters, etc. for processing the signal prior to delivery to the main computing device 130. In one embodiment, the transmit circuitry and/or receive circuitry may be implemented as an RF integrated circuit (RFIC) chip, and may comprise various components including, for example, mixers, a VCO, a frequency synthesizer, automatic gain control (AGC), passive and/or active filters, such as harmonic filters, dielectric filters, SAW filters, etc., A/D and/or D/A converters, modulators/demodulators, PLLs, upconverters/downconverters, and/or other analog or digital components that process baseband signals, RF signals, or IF band signals, etc.

As briefly discussed above, the transmission/reception of the RF based communication signals by the endpoint device 102 is carried out under control of the main computing device 130. In the example depicted in FIG. 2, the main computing device 130 may include a processor 160, a timing clock 162, and a memory 164, connected by a communication bus 166. As further depicted in FIG. 2, the main computing device 130 may also include an I/O interface 168 for interfacing with, for example, one or more sensors S associated with the utility meters UM. The sensors S may be any known sensors for obtaining consumption data, tampering data, etc. The data obtained from the sensors S are processed by the processor 160 and then stored in the memory 164.

Figure 8:
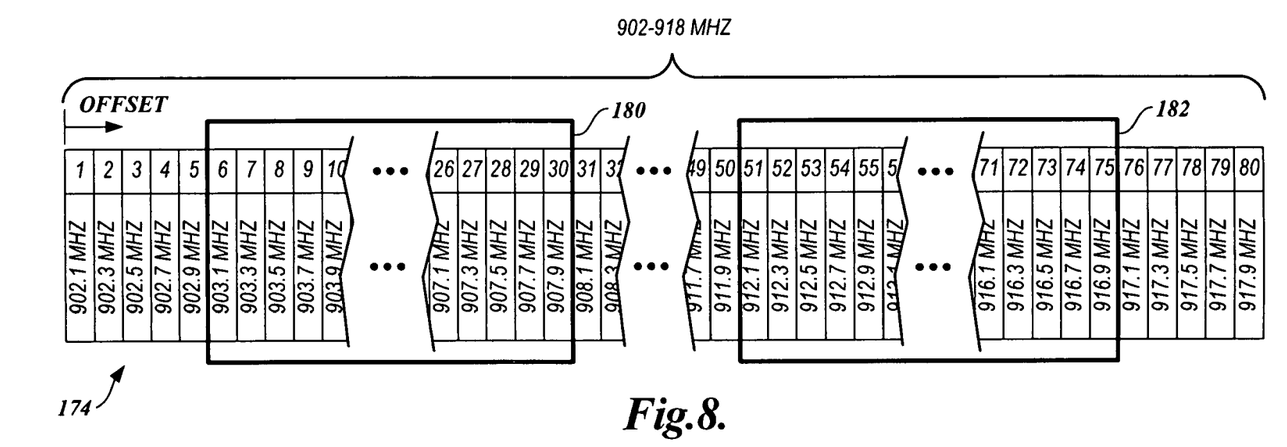
FIG. 8 is a schematic depicting one example of a frequency hopping table in accordance with an embodiment of the disclosed subject matter.

The memory 164 depicted in FIG. 2 is one example of computer-readable media suited to store data and program modules for implementing aspects of the claimed subject matter. Those skilled in the art and others will recognize that the processor 160 serves as the computational center of the endpoint device 102 by supporting the execution of instructions that are available from the memory 164. In the embodiment depicted in FIG. 2, the memory 164 stores at least one frequency hopping table 174, a type of look up table, and an endpoint device serial number 176, both of which may be programmed at the factory. One example of a frequency hopping table is schematically depicted in FIG. 8 and is set forth in detail in Table 1 below.

TABLE 1

| Hop Sequence No. | Channel (Center Frequency, MHz) | Channel No. |
| --- | --- | --- |
| 1 | 903.1 | 6 |
| 2 | 903.3 | 7 |
| 3 | 903.5 | 8 |
| 4 | 903.7 | 9 |
| 5 | 903.9 | 10 |
| 6 | 904.1 | 11 |
| 7 | 904.3 | 12 |
| 8 | 904.5 | 13 |
| 9 | 904.7 | 14 |
| 10 | 904.9 | 15 |
| 11 | 905.1 | 16 |
| 12 | 905.3 | 17 |
| 13 | 905.5 | 18 |
| 14 | 905.7 | 19 |
| 15 | 905.9 | 20 |
| 16 | 906.1 | 21 |
| 17 | 906.3 | 22 |
| 18 | 906.5 | 23 |
| 19 | 906.7 | 24 |
| 20 | 906.9 | 25 |
| 21 | 907.1 | 26 |
| 22 | 907.3 | 27 |
| 23 | 907.5 | 28 |
| 24 | 907.7 | 29 |
| 25 | 907.9 | 30 |
| 26 | 912.1 | 51 |
| 27 | 912.3 | 52 |
| 28 | 912.5 | 53 |
| 29 | 912.7 | 54 |
| 30 | 912.9 | 55 |
| 31 | 913.1 | 56 |
| 32 | 913.3 | 57 |
| 33 | 913.5 | 58 |
| 34 | 913.7 | 59 |
| 35 | 913.9 | 60 |
| 36 | 913.1 | 61 |
| 37 | 914.3 | 62 |
| 38 | 914.5 | 63 |
| 39 | 914.7 | 64 |
| 40 | 914.9 | 65 |
| 41 | 915.1 | 66 |
| 42 | 915.3 | 67 |
| 43 | 915.5 | 68 |
| 44 | 915.7 | 69 |
| 45 | 915.9 | 70 |
| 46 | 916.1 | 71 |
| 47 | 916.3 | 72 |
| 48 | 916.5 | 73 |
| 49 | 916.7 | 74 |
| 50 | 916.9 | 75 |

Figure 5:
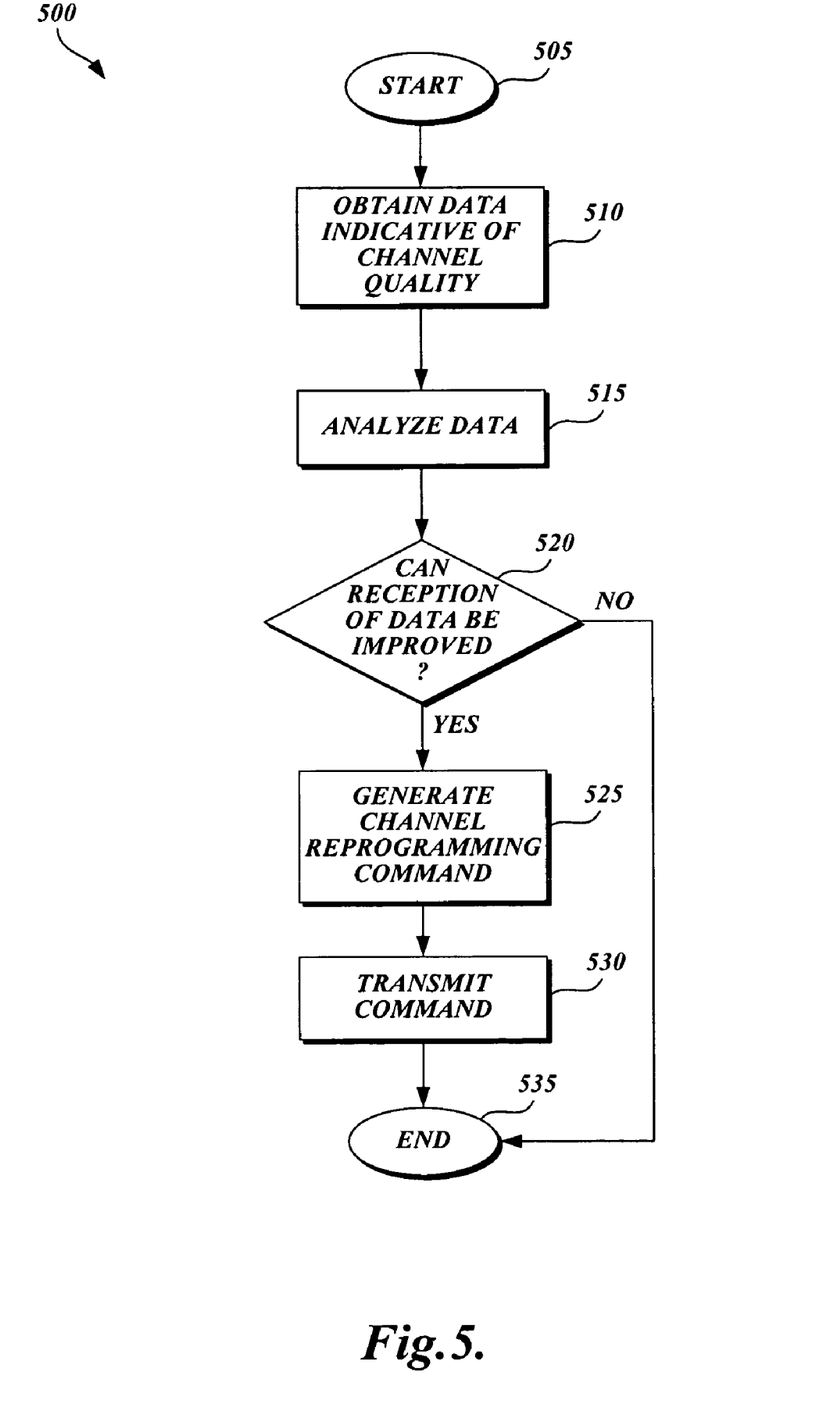
FIG. 5 is a flow diagram of one example of a channel quality analysis routine in accordance with an embodiment of the disclosed subject matter.

Referring now to Table 1 above, there is shown one example of a frequency hopping table formed in accordance with aspects of the present disclosure. The frequency hopping table sets forth the following: 1) Hop Sequence Number; 2) Channel (shown as the Center Frequency of the 200 KHz channel); and 3) Channel Number. In one embodiment, as best shown in the example of Table 1 and depicted schematically in FIG. 8, a subset of fifty (50) channels are utilized over the 902-918 MHz operational frequency band. In the embodiment shown in FIG. 8, the subset of channels is split into a first block of channels 180 and a second block of channels 182, although dividing the channels into more than two blocks may also be practiced by the endpoint devices. It will be appreciated that any number of channels may be contained in the first and second blocks of channels, although twenty-five (25) channels for each block of channels 180 and 182 are shown in FIG. 5.

Figure 9:
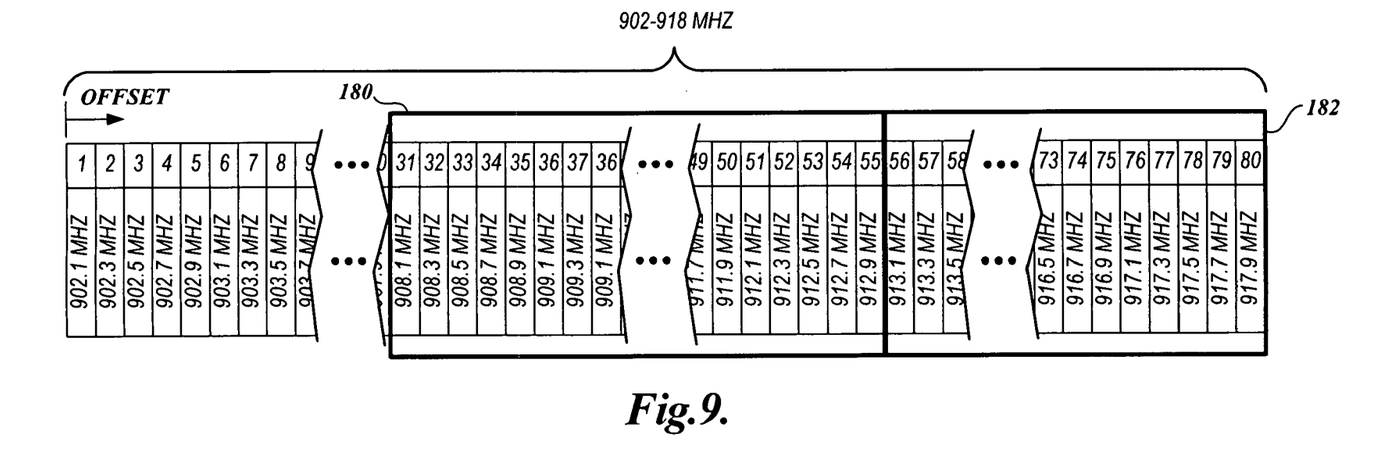
FIG. 9 is a schematic depicting another example of a frequency hopping table in accordance with an embodiment of the disclosed subject matter.

In one embodiment, the position of the first block of channels 180 along the operational frequency band of the endpoint device (e.g., 902-918 MHz) is defined by a first offset. Similarly, the position of the second block of channels 182 is defined by a second offset. The offsets are calculated by counting the number of channels from the lowest channel of the operational frequency band (i.e., 902 MHz in this example) to the beginning of the block of channels 180 and 182. In the example shown in FIG. 8, the first offset is five (5), and the second offset is fifty (50). FIG. 9 depicts another example of a frequency hopping table, where the first offset is thirty (30), and the second offset is fifty-five (55), thereby forming a contiguous block of 50 channels. As will be described in more detail below, each block of channels can be shifted up or down along the operational frequency band of the endpoint device in order to improve the collection system's ability to receive data transmitted by the endpoint device.

Returning to FIG. 2, the memory 204 also includes a reprogramming application 198 having instructions suitable for being executed by the processor 160 for implementing aspects of the present disclosure. In particular, the reprogramming application 198 is configured with program logic that allows, for example, reprogramming of the frequency hopping table 174 (e.g., the subset of channels) stored in memory 164 and accessed by the processor 160 for directing the communications device 132 to transmit data to the collection system 106 over one or more FHSS signals. For example, in one embodiment, the program logic, in response to a command received from the system 100, shifts the first block of channels 180 and/or the second block of channels 182 within the predefined operational frequency band (e.g., 80 channels in the 902-918 MHz band) from the positions shown, for example, in FIG. 8 to the positions shown, for example, in FIG. 9 to improve data reception by the collection system. Alternatively, in embodiments having a set of frequency hopping tables stored in memory 204, the program logic, in response to a command received from the system 100, selects a frequency hopping table from the set of frequency hopping tables that is better suited for improving reception of data by the collection system 106. One embodiment of a routine implemented by the reprogramming application 198 will be described in detail with reference to FIG. 6. Moreover, the generation of the command will be described in more detail below with reference to FIG. 5.

The processor 160 has the responsibilities within the endpoint device 102 of overall system timing and supervision including accumulating and storing sensor data, maintaining the position in the hop sequence, storing reprogrammed frequency hopping data, and providing data, such as a message, to be transmitted and selecting the frequency channel the data will be transmitted over. In one embodiment, the processor 160 effectuates the formatting or encoding of the meter data and other data in any standard format or protocol. In this regard, meter data in one embodiment are formatted as "packetized" data by the endpoint device 102 for transmission over the network. In the present application, the term "packetized" is intended to encompass packets, frames, cells, messages or any other method used to encapsulate data for network transmission. As understood in the art, packets typically maintain a plurality of fields as well as a preamble and trailer to identify the beginning and end of the packet. The packet may be formatted as an Interval Data Message ("IDM"), a standard consumption message ("SCM"), or other data packet formats utilized in an AMR environment. In one embodiment, packets formatted as IDM's are transmitted from the endpoint device 102 at regular intervals. The IDM packetized data maintains fields including an endpoint serial number field, a consumption data field, a cyclic redundancy check (CRC) field, and the like. It will be appreciated that the endpoint devices 102 may support multiple message types, allowing an entirely different message or packet format structure to be used.

The processor 160 further effects the transmission of the encoded or formatted data and the frequency channel upon which to send the message to the communications device 132. In this regard, the processor 160 sets the frequency synthesizer 152 to the proper frequency through monitoring of the VCO 150, for example, via a low pass filter and modulation adjust circuitry (not shown). The data is then transmitted as a frequency-hopping spread-spectrum (FHSS) signal 192 (see FIG. 1) at a frequency and time selected in accordance with a frequency hopping table, such as frequency hopping table 174 stored in memory 164. For example, in one embodiment, using the frequency hopping table 174 of FIG. 8 (and set forth in TABLE 1 above), the endpoint device 102 sequentially transmits FHSS signals through a programmed subset of fifty (50) frequency channels, within the operational frequency band.

In some embodiments where the FHSS signals 190 are transmitted over a subset of channels in the operational frequency band of 902-918 MHz, the endpoint devices 102 use unlicensed frequency-hopping spread-spectrum communication devices that operate in accordance with either FCC Part 15.249 (transmitting power less than 1 mW) or Part 15.247 (transmitting power less than 1 W). In one embodiment, a set of frequency hopping tables can be programmed into the endpoint device 102 to further minimize collisions, which in turn, further improves RF channel utilization and efficiencies. As briefly described above and described in more detail below, one frequency hopping table from the set of frequency hopping tables can be selected as the default table by data included in a command transmitted by the collection system 106.

Returning to FIG. 1, there is shown a plurality of CCUs 116, which may be arranged in a hierarchical network of overlapping zones of coverage, that receive data from endpoint devices 102 and forward the data by retransmission to the host computing system 110. Now with reference to FIG. 3, one example component architecture for a CCU 116 depicted in FIG. 1 will be described. Generally described, the CCU 116 includes a processor 300, a memory 302, and a clock 304 interconnected via one or more buses 306. In addition, the CCU 116 includes a network interface 308 comprising components for communicating with other devices over the wide area network 114 (FIG. 1), utilizing any appropriate protocol, such as TCP/IP Protocols (e.g., Internet), GPRS or other cellular-based protocols, Ethernet, WiFi, Broadband Over Power Line, and combinations thereof, etc. As further depicted in FIG. 3, the CCU 116 includes a radio-based communication device 310 for transmitting/receiving wireless communications with other radio-based devices (e.g., the endpoint devices 102, repeaters 118, etc.).

Figure 3:
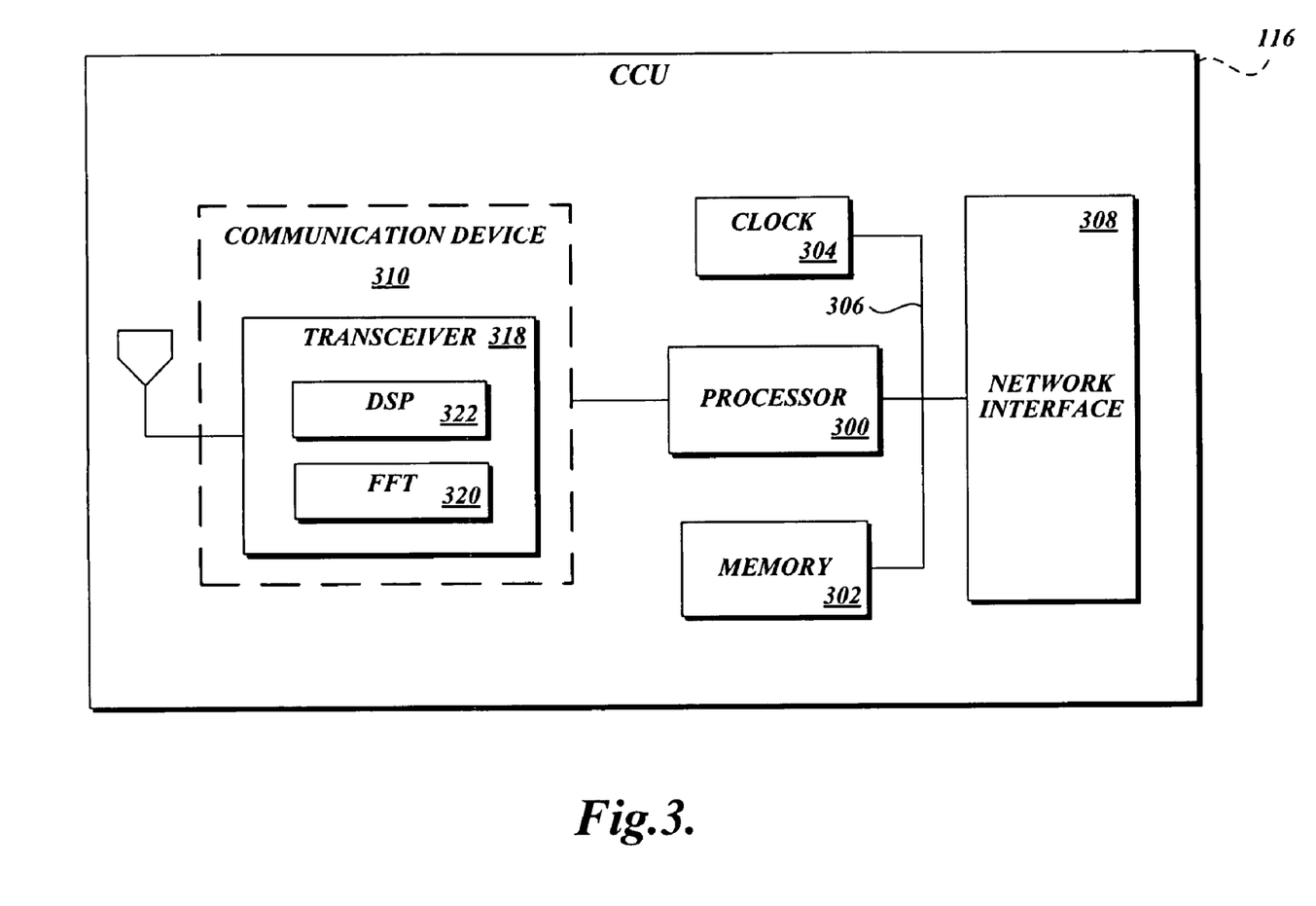
FIG. 3 is a block diagram depicting components of one example of a cell collector unit (CCU) formed in accordance with an embodiment of the disclosed subject matter.

In the embodiment shown in FIG. 3, the communication device 310 includes at least one transceiver, transmitter-receiver, or the like, generally designated 318, of half-duplex (transmit or receive but not both simultaneously) or full-duplex design (transmit and receive simultaneously) that is capable of identifying, locating, and tracking FHSS signals transmitted by the endpoint devices 102. To that end, the communication device 310 examines the entire portion of the operational frequency band employed by the endpoint devices 102, looking for a signal suggestive of meter data transmitted by an endpoint device 102 or repeater 118. In other words, the communication device 310, in effect, acts like a number of discrete radios that can each monitor a particular frequency within the endpoint device's operating frequency band.

Once data from an endpoint device 102 is detected, the transceiver 318 may employ a Fast Fourier Transform (FFT) engine 320 and digital signal processing via a digital signal processor (DSP) 322 to determine the narrowband frequency on which the data is being transmitted. As such, the radio-based communications device 310 has the ability to measure transmission characteristics, such as the signal strength levels and/or noise/interference levels, of all channels across the endpoints' operating frequency band like a digital spectrum analyzer. The result is that at each time interval a particular endpoint device transmits data, the CCU 116 can generate and store a "snapshot" of the measurement of, for example, signal strength and/or noise/interference levels in the frequency channels of the FFT. It will be appreciated that the radio-based communication device 310 may alternatively or additionally include an analog superheterodyne receiver stage for generating an analog based spectrum analyzer.

The signal strength data and/or noise/interference data measured by the CCU 116, which is indicative of channel quality, can then be forwarded to the host computing system 110 for further processing and analysis. In one embodiment, as will be described in more detail below, by analyzing the data indicative of channel quality over time a signal strength average value, a Received Signal Strength Indication (RSSI) average value, a noise/interference average value, other average values indicative of channel quality, etc., and combinations thereof, can be obtained for each frequency channel in the endpoint device's operating frequency band (e.g., 902-918 MHz). Such information may then be used to change the subset of channels employed by each endpoint device to transmit the FHSS signals.

It will be appreciated that other data indicative of channel quality can be collected by the collection system 106 and forwarded to the host computing system 110 for further processing. For example, the collection system 106 can collect and store data for each channel representative of a number of bad packets received, a ratio of bad packets received to good packets received, a ratio of preamble detections to good packets received, etc.

Still referring to FIG. 3, the processor 300 then processes the meter data and other data and stores such data in the memory 302. The processed meter and other data may be parsed and re-packaged into a structured format suitable for transmission over the wide area network 114 to the host computing device 110. In this regard, data from a plurality of CCUs 116 may be aggregated in a data store maintained by the utility service provider 112. The channel quality data, such as RSSI data, noise/interference data, read efficiency data, or other data indicative of channel quality collected at the CCU 116 may also be forwarded to the host computing system 110 for further processing.

Figure 4:
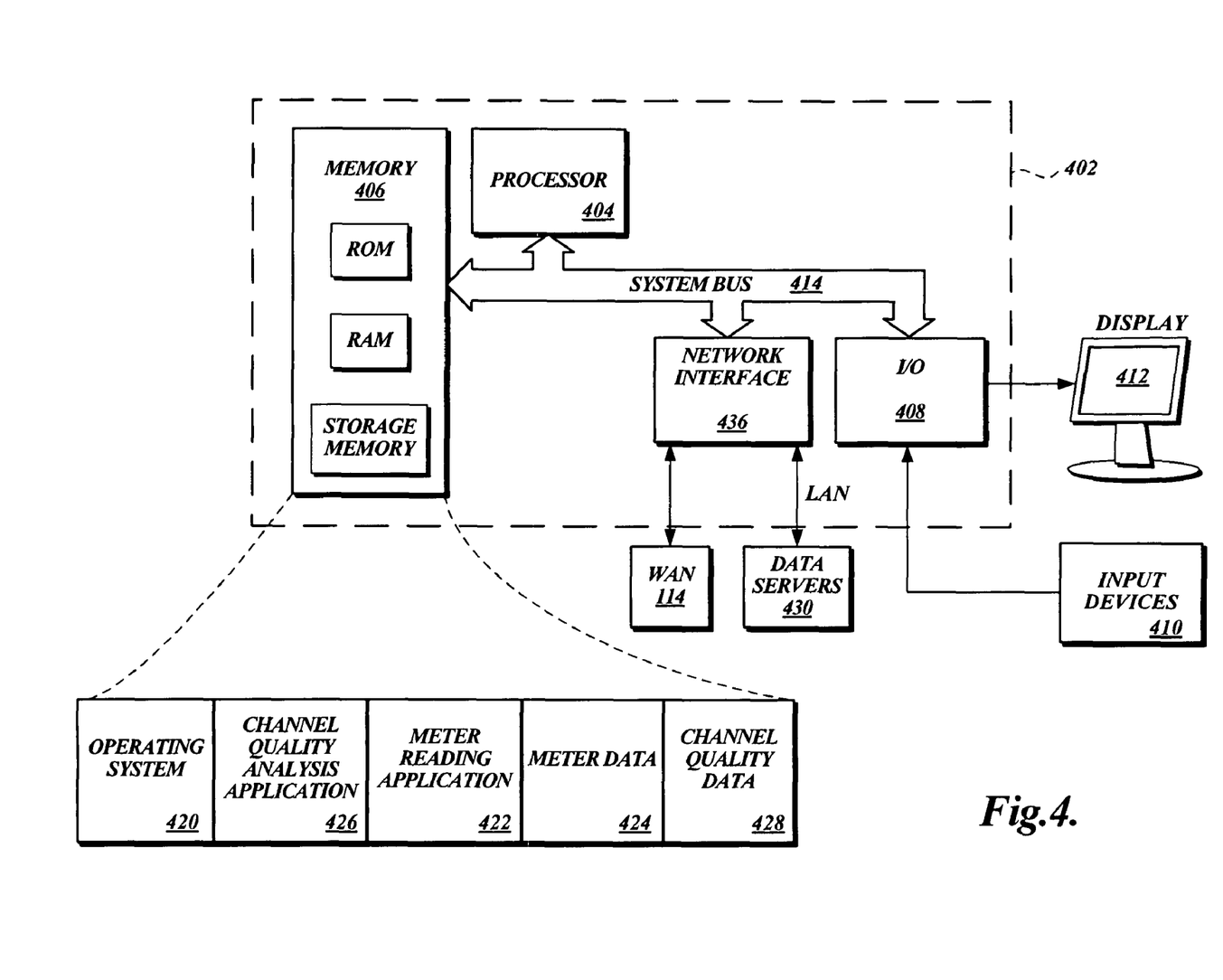
FIG. 4 is a block diagram depicting components of one example of a host computing system formed in accordance with an embodiment of the disclosed subject matter.

As stated above, data collected by the collection system 106 is forwarded using any suitable protocol to the host computing system 110 for processing and storage. One embodiment of the host computing system 110 is illustrated as a block diagram in FIG. 4. As shown in FIG. 4, the host computing system 110 includes at least one computing device 402, such as a personal computer (PC). The computing device 402 includes a processor 404, a memory 406, an I/O device 408 suitably interconnected via one or more buses 414. The I/O device 408 is connected to one or more input devices 410, such as a keyboard, touch pad, pointing device, etc., and a display 412. The memory 406 may include read only memory (ROM), random access memory (RAM), and storage memory. The storage memory and their associated computer-readable media provide non-volatile storage of computer readable instructions, data structures, program modules, and other data for the computing system 402.

The memory 406 stores an operating system 420 for controlling the operation of the computing device 402. In one embodiment of the present disclosure, the operating system provides a graphical operating environment, such as Microsoft Corporation's WINDOWS®, LINUX or Apple's Leopard graphical operating system in which activated application programs are represented as one or more graphical application windows with a display visible to the user. The memory 406 also stores a number of application programs 422, such as a host processing system and meter reading application(s), for processing collected meter and other data 424 from the endpoints 102. Processing of such data may include determining consumption of a predetermined interval for billing purposes, system reliability analysis, service outage analysis, tampering events, etc. Examples of meter reading applications 422 may include one or more applications commercially available from Itron, Inc., Liberty Lake, Wash.

The memory 406 may also store a channel quality analysis application 426 that analyses channel quality data 428 collected by the collection system 106. In particular, the channel quality analysis application 424 includes program logic that obtains a sample of channel quality data received from the collection system 106 and stored in memory 406, analyzes the data, and determines if reception of data by the collection system 106 can be improved. If it is determined that reception of data by the collection system 106 can be improved, the channel quality analysis application 424 generates a command to be sent to the specific endpoint device 102 via the collection system 106 to alter the channels of its frequency hopping table. One example routine implemented by the channel quality analysis application 426 will be discussed in detail below with regard to FIG. 5.

The meter data and/or channel quality data 426 may reside in memory 406 and/or on the data servers 430 accessible over a wired and/or wireless network, such as a local area network (LAN) by the computing device 402 via an appropriate interface, such as a network interface 436. As known to those skilled in the art and others, the network interface 436 of the computing device 402 illustrated in FIG. 4 may be configured to exchange files, commands, and other types of data over the wide are network 114.

Now, with reference to FIG. 5, one representative embodiment of a routine 500, suitable for being implemented by the channel data analysis application 424 is provided. As depicted in FIG. 5, the routine 500 begins at block 505 and proceeds to block 510. At block 510, a sample of data indicative of channel quality is obtained. For example, in one embodiment, the routine 500 may obtain channel quality data (e.g., signal strength data, RSSI data, interference/noise data, data representative of a number of bad packets received, data representative of a ratio of bad packets received to good packets received, data representative of a ratio of preamble detections to good packets received, etc.) collected by the collection system 106 during a standard interval of time, e.g., 30 days, 45 days, 60 days, etc., and stored in memory 406 or data servers 430. In some embodiments, other data indicative of channel quality may be used.

For example, the read coefficient, a metric that quantifies the number of meter readings successfully obtained by a CCU 116 from a particular endpoint device 102 for each operating channel, has been shown to be correlative to signal strength and interference/noise levels. In particular, a high read coefficient corresponds to a high signal strength level and a low interference/noise level, whereas a low read coefficient corresponds to a low signal strength level and a high interference/noise level. Since the total number of meter data transmitted over each channel during the sample time period is known, the read coefficient may be readily generated by comparing the packets successfully obtained by a CCU 116 with the total number of packets transmitted from an endpoint device 102.

Figure 7:
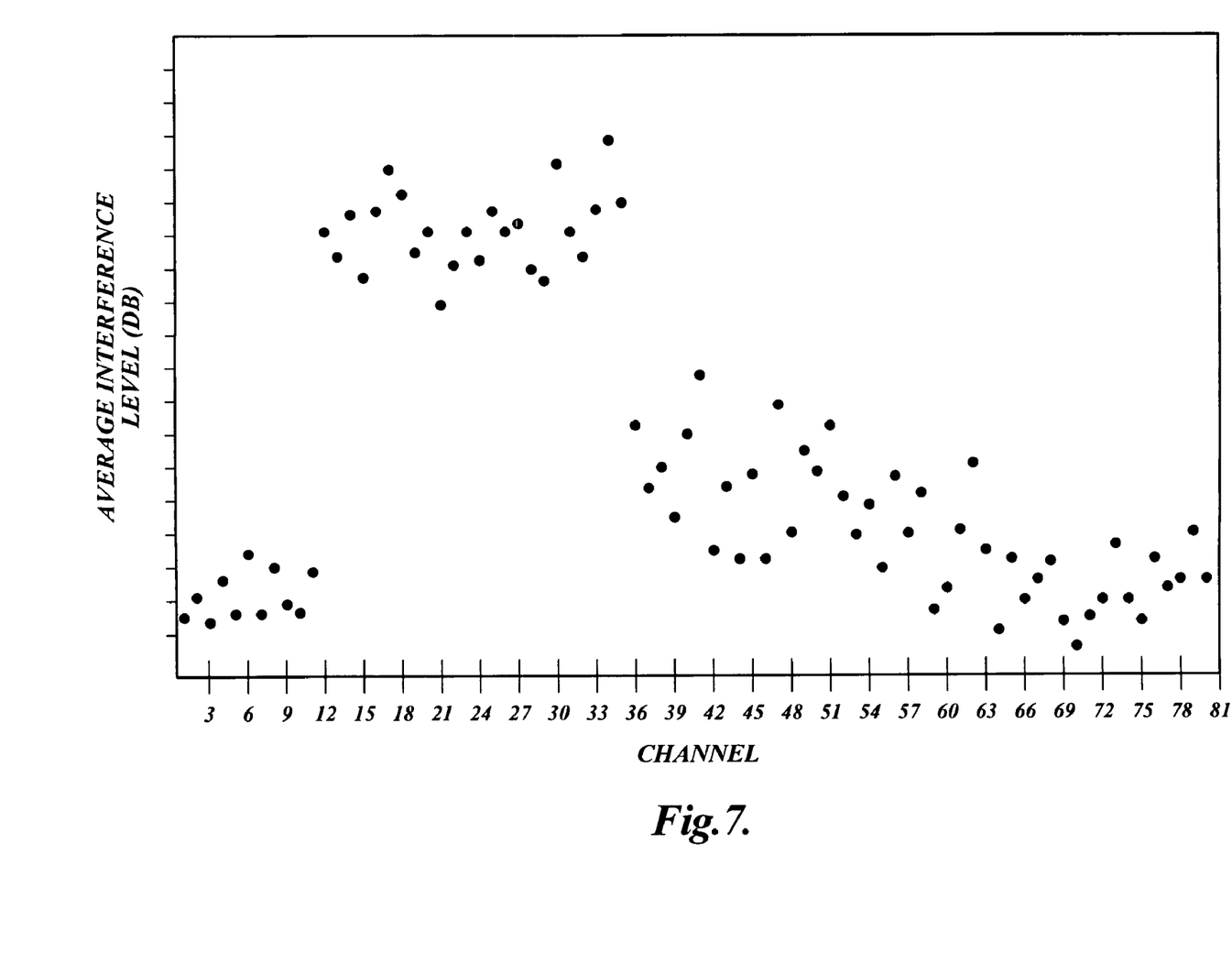
FIG. 7 is an example of a graph depicting channel quality data in accordance with an embodiment of the disclosed subject matter.

Next, at block 515, the channel quality data is analyzed to determine if any patterns exist with regard to the set of operating channels (e.g., the 902-918 MHz band used for the examples herein). The data may be analyzed in any manner to determine patterns, including separately or in combination (e.g. calculating Sign to Noise Ratio (S/N), Signal to Interference plus noise (SINR), etc.). For example, geographical obstructions may make some channels in a particular location undesirable at any time of day, and thus, time independent patterns of signal strength, interference/noise, S/N, SINR, etc. may occur. In one embodiment, the channel quality data is aggregated and an average channel quality value for each channel of the operational frequency band is calculated. For example, FIG. 7 is a graph depicting average values of interference levels (measured in db) collected over the channels of the operational frequency band during the sample period. As you can see in the graph, channels 12-35 have experienced a greater amount of interference over the sample period compared to channels 1-11 and 36-80.

In other embodiments, channel quality patterns, such as interference and/or noise patterns, may by time dependent, as from being generated by portable phones, garage door openers, unlicensed radios, etc. In this embodiment, data for a particular location may be analyzed at different times of the day. For example, portable phones using digital modulation may be stronger at selected times of the day, e.g., evenings, and thus, may affect the data reception at particular times during the day.

At block 520 of the routine 500, a determination is made as to whether an improvement in the potential reception of data by the collection system 106 can be obtained. In one embodiment, the default frequency hopping table of the endpoint device and the analyzed data are used. For example, from the serial number data received from the meter data collected by the collection system 106 the host computing system 110 knows either the specific frequency hopping table stored in the endpoint device's memory or whether the endpoint device is equipped with multiple frequency hoping tables stored in its memory and which frequency hopping table is currently the default table. With this information, the application 198, for example, can compare the default channels utilized by the endpoint device in transmitting data to the channel quality data of each channel quantified at block 515.

In one embodiment, the comparison attempts to determine the most appropriate channel allocation given the formatting of the frequency hoping table (i.e., two blocks of channels, three blocks of channels, etc.). The comparison may employ one or more statistical techniques (e.g., best fit, etc.) to arrive at the channel allocation. In the example shown in FIG. 7, the application may determine that the most appropriate channels are between 31 and 80, which avoids the high interference channels of between 12 and 29. As such, the routine determines the first and second offset values that would result in the utilization of channels 31-80 shown in FIG. 7. In this example, the routine determines the first and second offset values as thirty (30) and fifty-five (55), respectively. In one embodiment, after the offset values are determined, the routine 500 checks to see if any of the channels from the first and second blocks of channels overlap, and if so, corrects the channel overlap by, for example, incrementally shifting the first block of channels downwardly along the operation frequency band with respect to the second block of channels until no channel overlap exists.

Alternatively, the application can compare the default frequency hopping table of the endpoint device with both the analyzed data and the other frequency hopping tables stored in the endpoint device's memory and determine if a different frequency hopping table is more appropriate than the default frequency hopping table. In any case, the channel quality data of each channel quantified at block 515 may be used to modify the channels employed by the endpoint device for communication with the collection system 106. For example, the analyzed channel quality data may be used to reprogram the frequency hopping table of FIG. 8, or alternatively, may be used to select a different frequency table from the set of frequency hopping tables.

Next, at block 525 of the routine 500, a channel reprogramming command is generated for a specified endpoint device to be forwarded by the collection system 106. In one embodiment, the command includes data that will be used by the endpoint device to modify the channels employed by the endpoint device for communication with the collection system 106. For example, in one embodiment, the data can include an offset value for each block of channels 180 and 182 as a result of the determination made at block 520. In the example described herein, the first and second offset values are determined to be 30 and 55, respectively, so that the first and second blocks of channels 180 and 182 occupy channels 30-80 of the operational frequency band when reprogrammed so as to avoid the channels 12-35 as best as possible. Alternatively, for endpoint devices that have a set of frequency hopping channels stored in memory 164, the data includes a table number that corresponds to a specific frequency hopping table to be selected as the default frequency hopping table from the set of frequency hopping tables as a result of the determination made at block 520. After the command is generated, the routine proceeds to block 530, where the command is transmitted to the collection system 106 or the like to be distributed to the specific endpoint device 102. The routine ends at block 535.

It should be well understood that the routine 500 described above with reference to FIG. 5 does not show all of the functions performed within the host computing system 110 depicted in FIG. 1. Those skilled in the art and others will recognize that some functions and/or exchanges of data described above may be performed in a different order, omitted/added, performed by other devices, etc., or otherwise varied without departing from the scope of the claimed subject matter. For example, the routine 500 or portions thereof may be performed by the collection system 106. In one embodiment, the collection system 106 is capable of generating the command based on instructions from the host processing system 110. In another embodiment, some or all of the analysis of channel quality data can be carried out by the collection system 106.

The command transmitted from the host computing system 110 to the collection system 106 is then forwarded to the specific endpoint device 102. This may occur at the next "bubble-up" sequence of data transmission from the endpoint 102, or the collection system 106 can send a "wake-up" message in order to establish communication with the endpoint device 102. In response to the reprogramming command, the endpoint device 102 executes the reprogramming application 198, as will be described in more detail below.

Figure 6:
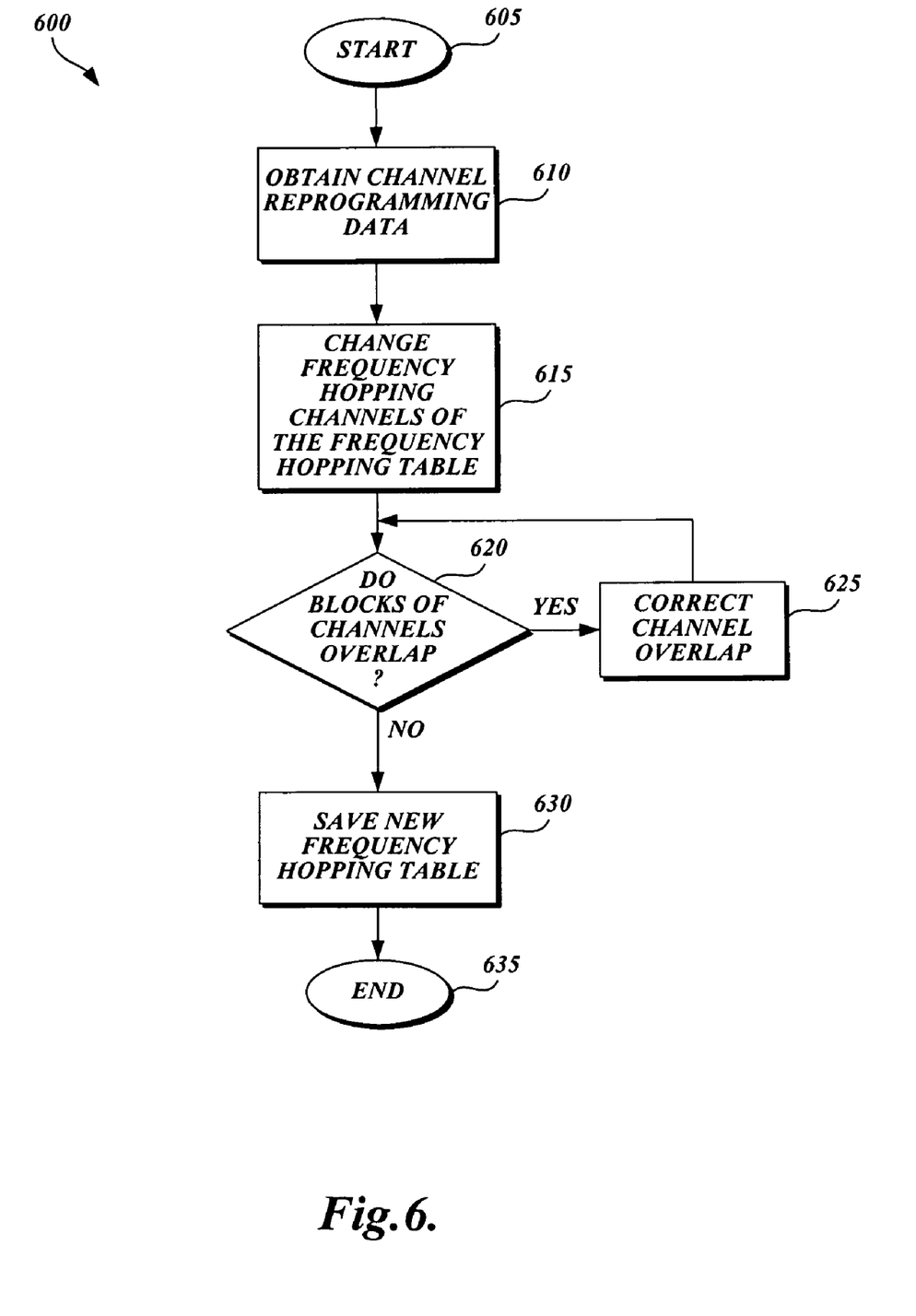
FIG. 6 is a flow diagram of one example of a channel reprogramming routine in accordance with an embodiment of the disclosed subject matter.

Referring now to FIG. 6, one representative embodiment of an endpoint reprogramming routine 600 implemented by the application 198 will now be described. Generally described, the endpoint reprogramming routine 600 changes the default frequency hopping table to one that increases the collection system's ability to receive data transmitted from the particular endpoint device 102.

As depicted in FIG. 6, the routine 600 begins at block 605 and proceeds to block 610, where channel reprogramming data is obtained from the command received from the CCU 116, the repeater 118, or other communication device, such as a mobile transceiver, handheld transceiver, etc. Next, at block 615, the channel reprogramming data is utilized for generating or obtaining a new frequency hopping table. In one embodiment, the channel reprogramming data includes one or more offset values that are utilized to shift the first and/or second blocks of channels either up or down the operational frequency band. For example, in the example discussed above, the command may include first and second offset values of 30 and 55 for the first and second blocks of channels 180 and 182, respectively. As a result of obtaining the first and second offset values, the application appropriately shifts the first and second blocks of channels 180 and 182 from the positions shown in FIG. 8, having first and second offset values of 5 and 50, respectively, to the positions shown in FIG. 9, having first and second offset values of 30 and 55, respectively. Alternatively, the channel reprogramming data includes an integer or the like that corresponds to one specific frequency hopping table to be selected from a set of stored frequency hopping tables stored in the memory of the endpoint device.

Returning to the example described above, once the first and second blocks of channels 180 and 182 are moved according the obtained offset data, the routine 600 proceeds to decision block 620, where the first and second blocks are checked to see if any channels overlap. If it is determined at decision block 620 that the channels overlap, then the routine proceeds first to block 625, where the overlap error is corrected using any suitable techniques. For example, the first block of channels can be shifted downwardly in frequency, for example, one (1) channel of the operational frequency band, away from the second block of channels. From block 625, the routine returns to decision block 620. If it is determined at decision block 620 that the channels do not overlap, then the routine proceeds to block 630. At block 630, the modified or "new" frequency hopping table is saved in memory as the default frequency hopping table. The routine ends at block 635.

In another example, if it is determined at decision block 620 that the channels overlap, then instead of proceeding to block 625 to correct the error, the routine can reject the reprogramming change and transmit an error message to the collection system 106. In this embodiment, after the message is transmitted, the routine ends at block 635.

It should be well understood that the routine 600 described above with reference to FIG. 6 does not show all of the functions performed within the endpoint device 102 depicted in FIG. 1. Those skilled in the art and others will recognize that some functions and/or exchanges of data described above may be performed in a different order, omitted/added, performed by separate devices, or otherwise varied without departing from the scope of the claimed subject matter. For example, it will be appreciated that the decision block 620 and subsequent block 625 are optional and may either be carried out by the collection system 106, the host computing system 110, or omitted altogether.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A system for improving reception of data by a collection system in a frequency-hopping spread spectrum environment, comprising: an endpoint device operable over a preselected set of transmission channels, the endpoint device comprising a frequency-hopping table having a subset of the preselected set of transmission channels and a transmission element that transmits data over the subset of preselected set of transmission channels; a collection system capable of monitoring the preselected set of transmission channels, receiving and storing meter data transmitted by the endpoint device, and measuring channel quality data for each channel of the preselected set of transmission channels contemporaneously with receiving the meter data from the endpoint device; and a host computing system capable of receiving and storing the meter data and the measured channel quality data, analyzing a sample of the channel quality data, generating a reprogramming command if it is determined by the analysis that reception of data at the collection system can be improved, and transmitting the generated command to the endpoint device.

2. The system of claim 1, wherein the frequency-hopping table stores the subset of transmission channels as first and second contiguous blocks of channels.

3. The system of claim 1, wherein the endpoint device is programmed for reprogramming the frequency-hopping table in response to receiving the generated command.

4. The system of claim 1, wherein the channel quality data is selected from the group consisting of signal strength data, RSSI data, interference/noise data, read coefficient data, data representative of a number of bad packets received, data representative of a ratio of bad packets received to good packets received, data representative of a ratio of preamble detections to good packets received, and combinations thereof.

5. The system of claim 1, wherein the command includes one or more offset values, and wherein the endpoint device, upon receiving the command, uses the one or more offset values to modify the frequency-hopping table.

6. The system of claim 1, wherein the endpoint device further comprises a set of frequency hopping tables, and upon reception of the command, the endpoint device is further operable to select a specific frequency-hopping table from the set of frequency hopping tables.

7. A communication system using a frequency-hopping spread spectrum protocol, comprising:
an endpoint device including
a frequency-hopping table stored in a memory element, the frequency-hopping table including a plurality of transmission frequency channels, and
a transmission element that transmits endpoint data over a first block of the plurality of transmission frequency channels, wherein the first block of channels is less than all of the plurality of transmission frequency channels;
a collection system including
a communication device that transmits and receives data in the communication system, wherein the communication device includes a transceiver that measures channel quality of the block of transmission frequency channels, and a memory element for storing transmitted endpoint data; and a host computing system including a network interface that transmits to and receives data from the collection system, and a processor that analyses the measured channel quality data received from the collection system, wherein the processor generates a reprogram command and the network interface transmits the reprogram command to the endpoint device via the collection system when channel quality can be improved.

8. A communication system as in claim 7, wherein the reprogram command modifies the block of transmission frequency channels.

9. A communication system as in claim 8, wherein the block is modified based on a channel offset.

10. A communication system as in claim 7, wherein the block is a subset of contiguous transmission channels.

11. A communication system as in claim 7, wherein the endpoint further includes a second block to transmit endpoint data over the plurality of transmission frequency channels.

12. A communication system as in claim 11, wherein the second block is a subset of contiguous transmission channels different from the first block.

13. A communication system as in claim 7, wherein the first transmission block is modified based on the received reprogram command.

14. A communication system as in claim 7, wherein the channel quality data is selected from the group consisting of signal strength data, RSSI data, interference/noise data, read coefficient data, data representative of a number of bad packets received, data representative of a ratio of bad packets received to good packets received, data representative of a ratio of preamble detections to good packets received, and combinations thereof.

15. A communication system as in claim 7, wherein the endpoint device further includes a plurality of frequency hopping tables and after receiving the reprogram command, the endpoint selects a specific frequency-hopping table from the set of frequency hopping tables.

16. A communication system as in claim 7, wherein the endpoint only transmits data over the plurality of transmission frequency channels within the first block.

\* \* \* \* \*